United States Patent [19]

Wallis

[11] 3,756,425
[45] Sept. 4, 1973

[54] TRANSFER DEVICE

[76] Inventor: Bernard J. Wallis, 25200 Trowbridge Ave., Dearborn, Mich.

[22] Filed: Mar. 8, 1971

[21] Appl. No.: 121,905

[52] U.S. Cl. .................. 214/1 BB, 198/19, 198/218
[51] Int. Cl. ............................................. B65g 25/02
[58] Field of Search .............................. 198/19, 218; 214/1 BB, 1 BT

[56] References Cited
UNITED STATES PATENTS

| | | | |
|---|---|---|---|
| 3,411,636 | 11/1968 | Wallis | 214/1 BB |
| 3,165,192 | 1/1965 | Wallis | 214/1 BB X |
| 3,397,799 | 8/1968 | Wallis | 214/1 BB |
| 3,521,761 | 7/1970 | Wallis | 214/1 BB |

Primary Examiner—Robert J. Spar
Attorney—Barnes, Kisselle, Raisch & Choate

[57] ABSTRACT

A transfer device for progressively indexing workpieces between stations in a die mounted in a press. The transfer device, or transfer mechanism, is positioned along side the press bed. A work-gripping fingerbar is supported for transverse movement on a carriage which is slidably movable lengthwise of the press. The fingerbar moves in a rectangularly-shaped path derived from the combined shifting of the fingerbar on the carriage and shifting of the carriage lengthwise of the press. An axially shiftable rod extends lengthwise through the carriage and is axially reciprocated to produce the described motion of the fingerbar. The fingerbar is transversely shifted by a cam follower on the rod which engages a helical cam groove in a sleeve journalled within the carriage to rotate the sleeve as the rod is shifted relative to the carriage. Means which operatively connect the sleeve to the fingerbar for shifting the latter includes a yieldable coupling. A positive safety retract mechanism is also operatively connected to the fingerbar and is operative independently of the rod. The safety retract mechanism is positioned to be operated by the descending press ram should the usual drive arrangement fail to retract the fingerbar from between the closing halves of the die. The safety retract mechanism rotates a shaft which breaks the yieldable coupling to retract the fingerbar.

14 Claims, 12 Drawing Figures

INVENTOR
BERNARD J. WALLIS
BY
Barnes, Kisselle, Raisch & Choate
ATTORNEYS

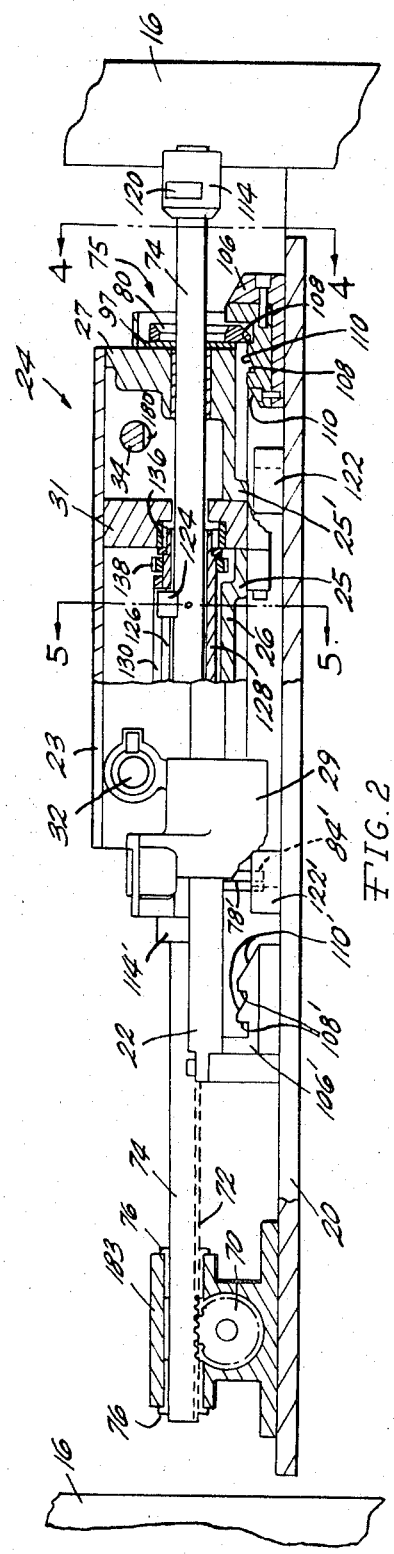

INVENTOR
BERNARD J. WALLIS

BY
Barnes, Kisselle, Raisch & Choate
ATTORNEYS

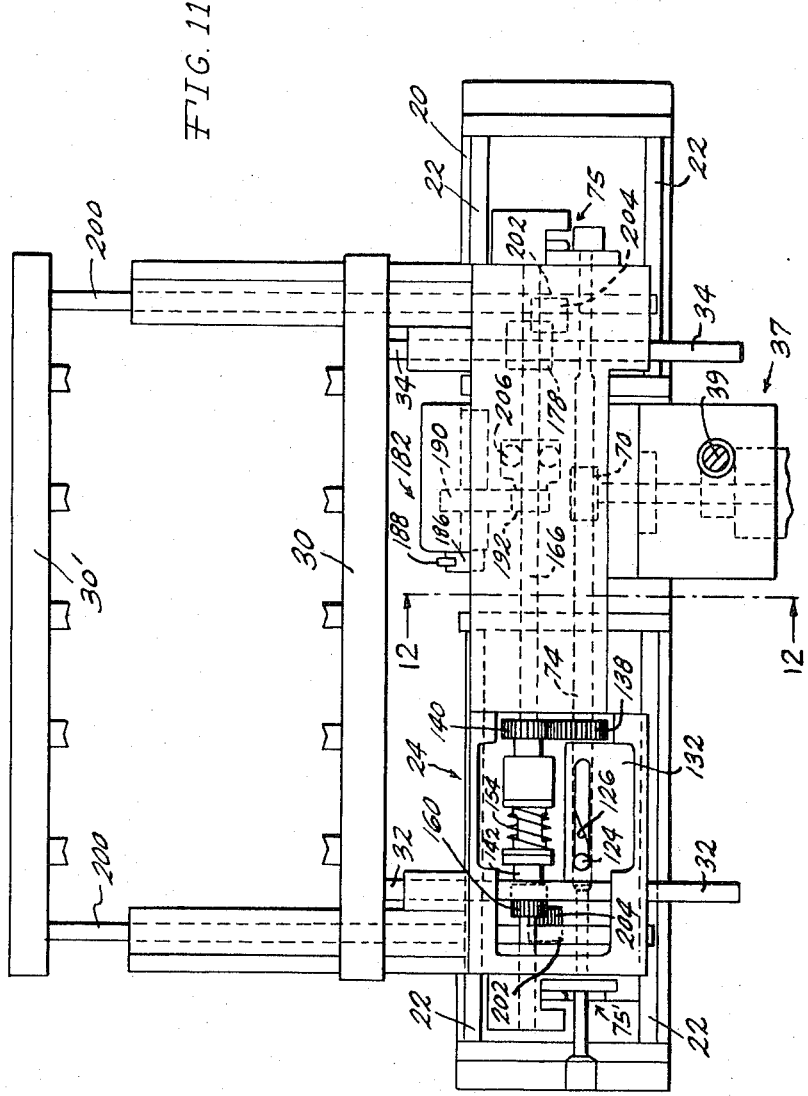

TRANSFER DEVICE

This invention relates to transfer mechanisms and more specifically to a transfer for progressively indexing workpieces between stations of a die mounted in a press.

It is an object of the invention to provide a transfer mechanism adapted to be driven by the vertical reciprocating motion of the press ram, the transfer drive including a yieldable drive coupling for the work-gripping fingerbar which enables the fingerbar to be retracted by the descending press ram in the event of a jam or other failure in the transfer drive.

Another object of the invention is to provide an improved transfer mechanism of the type described which includes a positive safety retract mechanism for removing the work-gripping members of the transfer mechanism from between the closing halves of the die should the usual drive means for the transfer mechanism be rendered inoperative.

A further object of the invention is the provision of a transfer mechanism whose stroke lengths may be conveniently changed with a minimum number of modifications.

Another object of the invention is to provide a transfer mechanism of the type described which is reasonably compact and especially of relatively narrow width relative to its length so that the mechanism, when positioned along one side of the press bed, extends outwardly therefrom a relatively small distance so as to occupy a relatively small amount of floor space.

In the drawings:

FIG. 2 is a view taken along line 2—2 in FIG. 1.

FIG. 3 is an enlarged sectional view taken along line 3—3 in FIG. 1.

FIG. 11 is a plan view having portions broken away of an alternative embodiment of the transfer mechanism of the present invention.

Figure 1:
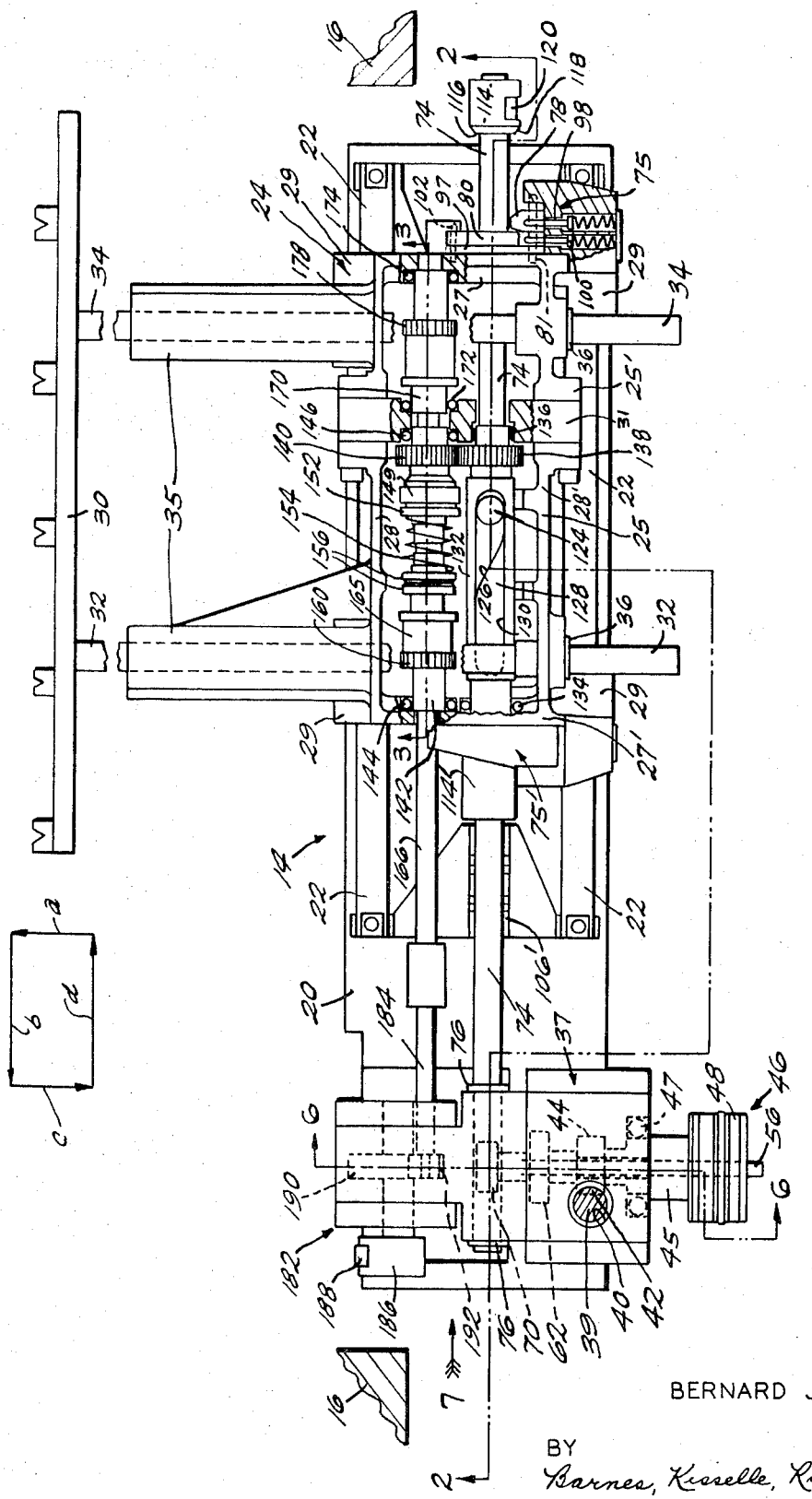
FIG. 1 is a plan view of the transfer mechanism of the present invention having portions broken away.

Referring now to FIGS. 1 and 2, the transfer mechanism 14 of the present invention is positioned along one side of a press (not shown) between two uprights 16 of the press. Mechanism 14 comprises a base plate 20 supported by means (not shown) adjacent the bed of the press. Base 20 supports a pair of guide rods 22 on which a carriage 24 is slidably movable in a direction lengthwise, or longitudinally, of base 20. The hollow, generally rectangular shape of carriage 24 is defined by a bottom 26, a pair of end walls 27 and 27' and a pair of side walls 28 and 28'. In the illustrated construction, carriage 24 is formed from a pair of castings 25 and 25' which are attached to a partition 31. Partition 31 extends between side walls 28 and 28' and is spaced intermediate end walls 27 and 27'. A cover 23 encloses the open top of carriage 24. A guide sleeve 29 at each of the four lower corners of carriage 24 slidably engages one of the guide rods 22. A work-gripping member, or fingerbar, 30 is supported on carriage 24 transversely inwardly of base 20 by means of a pair of fingerbar support rods 32 and 34. Rods 32 and 34 are spaced vertically above guide rods 22, and each is slidably arranged within a hollow arm 35 and a bushing 36 on carriage 24.

Fingerbar 30 is horizontally aligned in a plane with another fingerbar (not shown) on another transfer mechanism (not shown) positioned on the opposite side of the press. An operative connection (not shown) is provided between the shown mechanism 14 and the other mechanism to cause fingerbar 30 to cooperate with the other fingerbar to progressively index workpieces (not shown) between successive stations in a die mounted in the press. The motion diagram of fingerbar 30 is indicated by arrows $a$, $b$, $c$ and $d$ in FIG. 1. With fingerbar 30 in the position shown in FIG. 1, both fingerbars are shifted transversely inwardly toward each other to grip the workpieces, the motion of fingerbar 30 being indicated by arrow $a$. Both fingerbars, along with the workpieces, are advanced in unison in the direction of arrow $b$ by shifting the respective carriages forwardly. The fingerbars are then moved away from each other to release the workpieces, fingerbar 30 being moved in the direction of arrow $c$. Each carriage is finally returned in the direction of arrow $d$ to complete the cycle.

Figure 6:
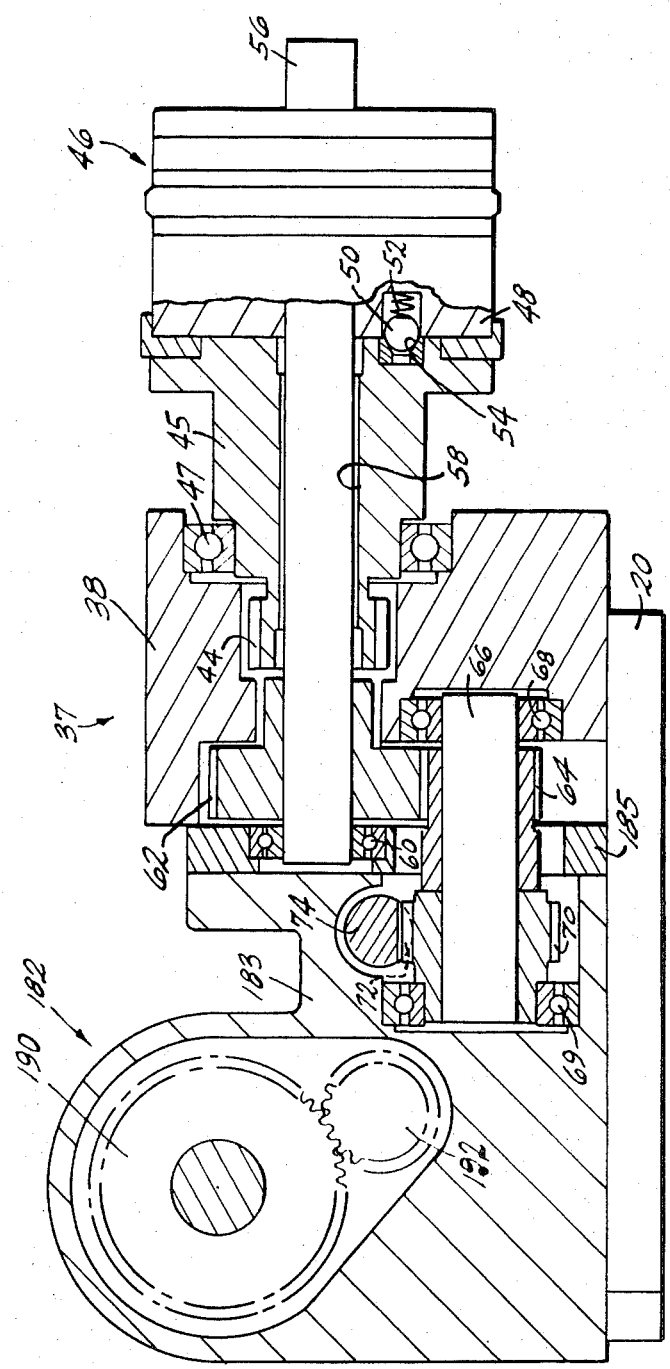
FIG. 6 is an enlarged sectional view taken along line 6—6 in FIG. 1.

Describing now the structure for producing the motion of fingerbar 30 and referring also to FIG. 6, a drive unit 37 is mounted on the left-hand end of base 20 as viewed in FIG. 1. Drive 37 comprises a gear box 38 within which various moving members are situated. A vertical shaft 39, which is reciprocated by the press ram (not shown), extends vertically downwardly through a circular opening 40 in gear box 38. Shaft 39 includes a rack portion 42 which meshes with a pinion 44 on a drive member 45 of an overload disconnect device 46. Overload disconnect 46 is similar to the type disclosed in my pending application, Ser. No. 12,271 filed Feb. 18, 1970. Drive member 45 is journalled in bearing 47 which supports overload disconnect 46 on one side of gear box 38. Overload disconnect 46 further includes a driven member 48 which is releasably coupled to drive member 45 in the following fashion. A plurality of circularly arranged bearing balls 50, each of which is preloaded by a spring 52 in member 48, engage corresponding chamfered seats 54 in drive member 45. The tension in springs 52 establishes the maximum torque which may be transmitted from drive member 45 to driven member 48. Whenever this maximum torque is exceeded, balls 50 are retracted from seats 54 to break the driving connection between members 45 and 48. A cylindrical shaft 56 is fixedly attached to driven member 48 and extends into gear box 38 through a hole 58 in drive member 45. The inner end of shaft 56 is supported by a set of bearings 60 and drives a pinion 62. Pinion 62 in turn meshes with a pinion 64 on a stub shaft 66 which is journalled within gear box 38 as at 68. The other end of shaft 66 is journalled in a bearing 69 which is mounted in a housing 183 which will be later described. An output pinion 70 on shaft 66 engages a rack portion 72 of a rod 74. Rod 74 is guided by bushings 76 (FIG. 2) within housing 183 and extends lengthwise of base 20. Thus, with this arrangement, as shaft 39 is vertically reciprocated by the press ram, drive unit 37 reciprocates rod 74 lengthwise of base 20. In this respect and with respect to the hereinafter described latch arrangement, the transfer mechanism herein described is similar to that disclosed in my U.S. Pat. No. 3,411,636, dated Nov. 19, 1968.

Referring to FIG. 1, two identical latching arrangements 75 and 75' are provided, one at the outside of each end wall 27 and 27' respectively of carriage 24. Each latching arrangement performs a dual function. That is, when fingerbar 30 is being shifted transversely inwardly, latch arrangement 75 on end wall 27 locks carriage 24 to base 20; and when carriage 24 is being shifted forwardly, that same latch arrangement locks rod 74 to carriage 24. The other latch arrangement 75' performs similar functions for movement of fingerbar 30 and carriage 24 in the opposite directions.

Figure 4:
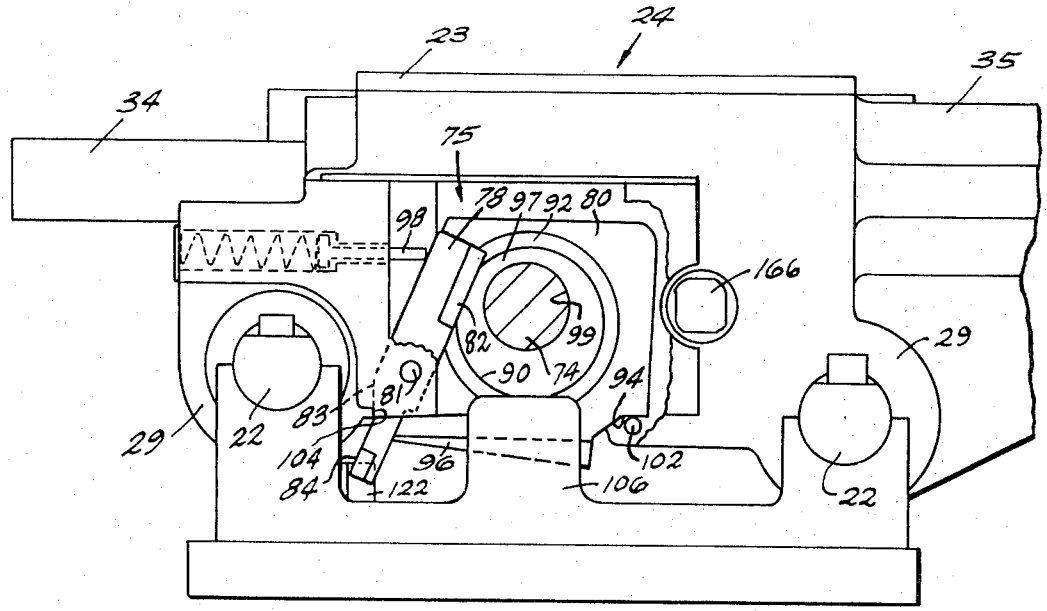
FIG. 4 is an enlarged view taken along line 4—4 in FIG. 2.
Figure 9:
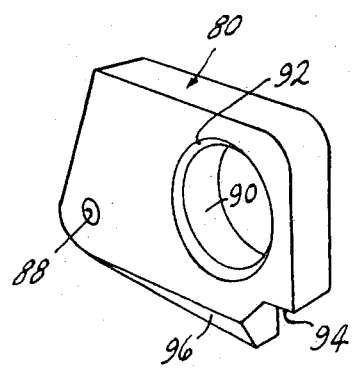
FIG. 9 is a perspective view of a gate member used in the disclosed embodiment.
Figure 8:
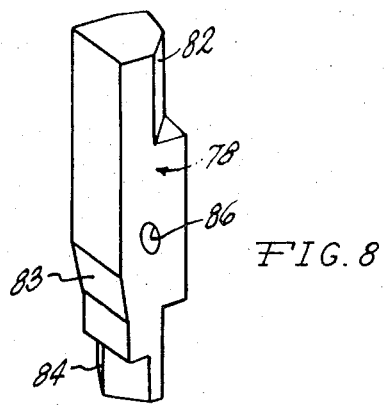
FIG. 8 is a perspective view of a latch member used in the disclosed embodiment.

Referring more specifically to FIGS. 1 and 4, latch arrangement 75 comprises a latch member 78 and a gate member 80 pivoted on wall 27 by means of a pin 81. Perspective views of latch 78 and gate 80 are shown in FIGS. 8 and 9 respectively. Latch 78 has a tapered catch 82 at its upper end and an inclined heel surface 84 at its lower end. A circular hole 86 extends through latch 78 between its two ends for pivoting latch 78 on pin 81. An inclined stop surface 83 is formed at the edge of latch 78 adjacent hole 86. Gate 80 is somewhat rectangular in shape and includes a circular hole 88 near a lower corner. Pin 81 passes through hole 88 when gate 80 is mounted on carriage 24. A much larger circular hole 90 extends through gate 80, and the outer edge thereof is chamfered as at 92. The lower corner of gate 80 opposite hole 88 is notched to form a rest pad 94. The lower edge of gate 80 is provided with a cam surface 96. Still referring to FIGS. 1 and 4, a wear plate 97 having a circular hole 99 is positioned between gate 80 and end wall 27. A pair of independently movable spring loaded pins 98 and 100 bias the two members 78 and 80 in the clockwise direction as viewed in FIG. 4. In this position, pad 94 of gate 80 rests on a pin 102 on end wall 27 such that the center of hole 90 is eccentric with respect to the axis of rod 74. The stop surface 83 of latch member 78 abuts a stop 104 on carriage 24 to maintain latch 78 in the position shown.

One of the two locking functions of latch arrangement 75 is provided by the engagement of gate 80 with a locking bar 106 which is fixedly attached on base 20 to thereby lock carriage 24 thereto. As is more clearly shown in FIG. 2, locking bar 106 comprises a pair of shoulders 108 which are formed by cam surfaces 110. When carriage 24 is locked to base 20, the lower edge of gate 80 engages behind the second shoulder 108.

The other locking function is provided in the following manner. A generally cylindrical drive bushing 114 is attached to the right-hand end of rod 74 as viewed in FIG. 1. THe inner end surface 116 of bushing 114 is adapted to abut wear plate 97. The circular edge of bushing 114 adjacent end 116 is chamfered as at 118, and a notch 120 is formed in the side of bushing 114 behind chamfer 118. When rod 74 is locked to carriage 24, catch 82 of latch 78 engages notch 120 in bushing 114.

Describing more specifically the operation of latch arrangement 75, as rod 74 is shifted to the left as viewed in FIG. 1, the upper portion of chamfer 118 engages the nearer inclined surface of catch 82 to rotate latch member 78 in the counter-clockwise direction as viewed in FIG. 4. Continued movement of rod 74 now causes the upper portion of chamfer 118 to engage the upper portion of chamfer 92 and thereby rotate gate 80 in the counter-clockwise direction also. When end surface 116 abuts wear plate 97, spring 98 urges latch 78 in the clockwise direction to engage catch 82 with notch 120 and thereby lock carriage 24 to rod 74. At the same time, the lower edge of gate 80 is fully rotated out of engagement with shoulder 108 to thereby unlock carriage 24 from base 20. When carriage 24, after having been shifted to the left, or forwardly, is returned toward the position shown in FIG. 2, the contact of cam surface 96 with cam surfaces 110 successively ratchets gate 80 until the lower edge thereof finally engages behind the second shoulder 108 to lock carriage 24 to base 20.

Figure 5:
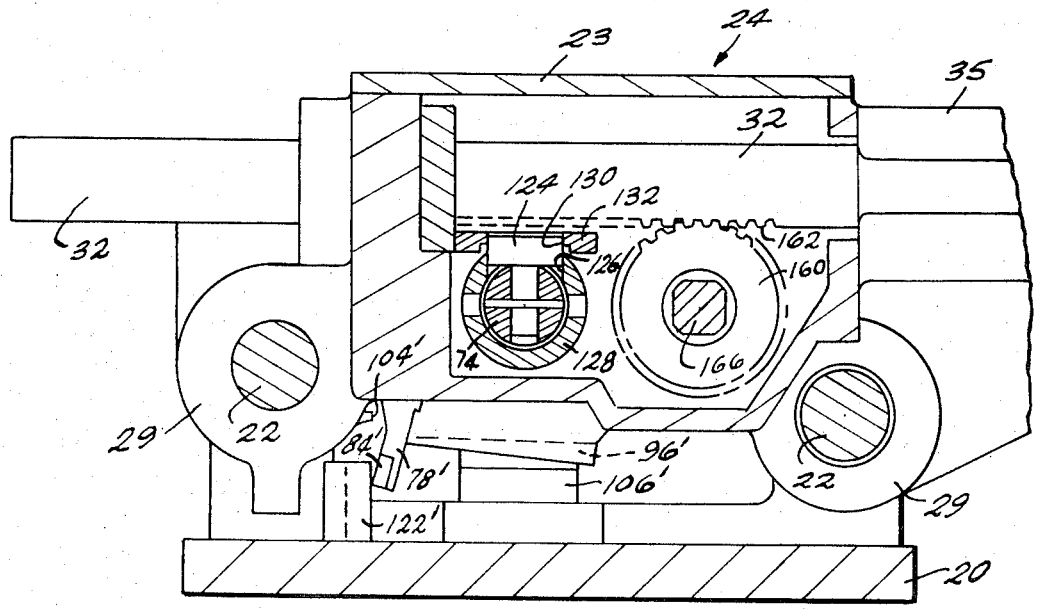
FIG. 5 is an enlarged sectional view taken along line 5—5 in FIG. 1.
Figure 10:
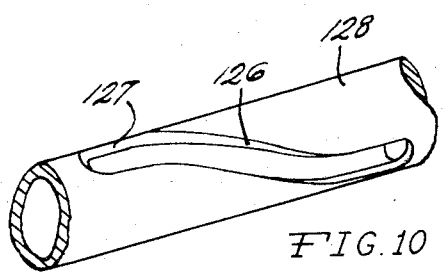
FIG. 10 is a perspective view of a sleeve having a helical cam track formed therein and used in the disclosed embodiment.

Latch arrangement 75' is identical to latch arrangement 75, and the component parts thereof, which are identical to the parts of latch arrangement 75, are indicated by identical primed numerals. A locking bar 106' on base 20 and a bushing 114' on rod 74 are also associated with latch arrangement 75'. A pair of latch release cams 122 and 122' are positioned on base 20 to release latch members 78 and 78' from locking engagement with bushings 114 and 114' as will soon become apparent. Referring now to FIGS. 1, 2 and 5, a cam follower 124 is pinned to a portion of rod 74 within carriage 24. Cam follower 124 projects upwardly of rod 74 through a generally helically shaped cam slot 126 in the wall of a cylindrical sleeve 128 which is concentric with rod 74. (See FIG. 10.) The uppermost portion of follower 124 engages a straight slot 130 in a guide plate 132 which is fixedly attached to wall 28'. Slot 130 constrains cam follower 124 to prevent rotation of rod 74 as the latter is axially shifted. Because sleeve 128 is journalled within carriage 24 as will soon become apparent, lengthwise reciprocation of rod 74 produces rotary reciprocation of sleeve 128.

As viewed in FIG. 1, sleeve 128 is supported on bearings 134 and 136 in wall 27' and partition 31. A pinion 138 is affixed to the end of sleeve 128 adjacent partition 31. Pinion 138 in turn meshes with another pinion 140 which shifts rods 32 and 34 by the structure which is now to be described.

Referring also to FIG. 3, pinion 140 is yieldably coupled to a sleeve 142 which is supported for rotation between end wall 27' and partition 31 by means of bearings 144 and 146. The coupling arrangement between pinion 140 and sleeve 142 is somewhat similar to that previously described in connection with overload device 46. Here a driving connection is formed between pinion 140 and a driven ring 149 which is fixedly attached on sleeve 142. A plurality of bearing balls 148 in ring 149 are maintained against chamfered seats 150 in the left-hand face of pinion 140 as viewed in FIG. 3. A second ring 152 is urged to engage balls 148 against seats 150 by means of a large coil spring 154. Spring 154 is positioned around sleeve 142, and the spring tension may be varied by adjusting a pair of lock nuts 156 which are screwed onto a threaded portion 158 of sleeve 142. Whenever the torque transmitted between pinion 140 and ring 149 exceeds a value established by the tension of spring 154, balls 148 unseat from seats 150 to break the driving connection between pinion 140 and ring 149.

A gear 160 on the left-hand end of sleeve 142 meshes with a rack portion 162 of rod 32. Immediately adjacent gear 160 are four rollers 164 which are disposed in a retainer 165 at 90 degree intervals about the axis of sleeve 142. Each roller 164 engages a surface of a square shaft 166 which extends completely through sleeve 142. Rollers 164 couple rotation of sleeve 142 to shaft 166. This arrangement permits carriage 24 to be shifted longitudinally while shaft 166 remains axially fixed with respect to base 20. Shaft 166 continues through an opening 168 in partition 31 and through another sleeve 170 which is aligned with sleeve 142 and journalled as at 172 and 174. Shaft 166 is engaged by a second set of four rollers 176 which are identical to the rollers 164. A pinion 178 on sleeve 170 engages a rack portion 180 of rod 34. Hence, with the arrangement just described, the rotation of gear 140 is yieldably coupled to shift rods 32 and 34 in unison.

Figure 7:
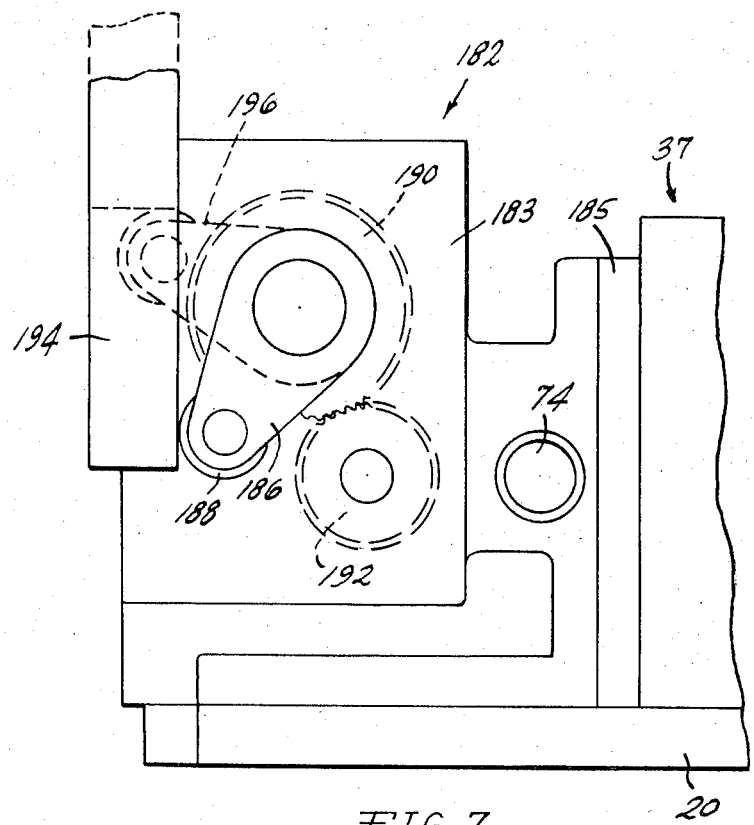
FIG. 7 is an enlarged fragmentary view taken in the direction of arrow 7 in FIG. 1.

Referring now to FIGS. 1 and 7, the left-hand end of shaft 166 is coupled to a positive safety retract mechanism 182 by a connecting shaft 184. Safety retract mechanism 182 is situated within a housing 183 which is separated from gear box 38 by a spacer plate 185. Safety retract 182 comprises a crank arm 186 having a roller 188 at the outer end thereof. Crank arm 186 is positioned to be operated by a bar 194 on the press ram to retract fingerbar 30 should the conventional drive arrangement be rendered inoperative with fingerbar 30 in an extended position. Crank arm 186 rotates a larger pinion 190 which meshes with a smaller pinion 192 on the end of coupling shaft 184. Hence, as arm 186 is operated by the press ram, safety retract 182 rotates shaft 166.

A normal operating cycle of transfer mechanism 14 is now described. With the mechanism as shown in FIG. 1, fingerbar 30 is in the retracted position and carriage 24 is in the return position. Shaft 39 moves upwardly with the ascending press ram to begin shifting rod 74 to the left as viewed in FIG. 1. At this time, gate 80 locks carriage 24 to base 20. Hence, cam follower 124 is shifted relative to guide plate 132 to rotate sleeve 128 and pinion 138 on the counter-clockwise direction as viewed in FIG. 5. Pinion 140 is in turn rotated to shift rods 32 and 34, and hence fingerbar 30 to the extended, work-gripping position in the direction of arrow a. The shape of cam 126 preferably includes a segment 127 which extends parallel to the length of sleeve 128. Follower 124 engages segment 127 when fingerbar 30 is in the work-gripping position. By dimensioning cam 126 such that segment 127 is always engaged by follower 124 during shifting of rod 74, accurate positioning of fingerbar 30 in the extended position is consistently maintained.

When bushing 114 abuts wear plate 97, rod 74 is locked to carriage 24 by latch 78 and further rotation of sleeve 126 is prevented. Carriage 24 is now shifted forwardly by rod 74 in the direction of arrow b to the advance position. As carriage 24 reaches the advance position, the press ram comes to the top of its stroke. Just prior to this time, latch release cam 122 engages heel 84 of latch member 78 to pivot catch 82 out of engagement with notch 120 in bushing 114. Rod 74 is therefore no longer locked to carriage 24. When carriage 24 is fully advanced, the lower edge of gate 80' is positioned behind the left-hand shoulder 108' of locking bar 106' to thereby lock carriage 24 to base 20.

As the press ram moves downwardly, rod 74 is returned to the right as viewed in FIG. 1. Follower 124 now rotates sleeve 128 in the clockwise direction as viewed in FIG. 5. In turn rods 32 and 34 are shifted in the direction of arrow c to return fingerbar 30 to the retracted position. When follower 124 reaches the right-hand end of slot 130, bushing 114' engages latch arrangement 75' at the left-hand end of carriage 24 to unlock carriage 24 from base 20, and lock rod 74 to carriage 24.

Continued movement of rod 74 axially to the right now returns carriage 24 in the direction of arrow d to the return position. As carriage 24 approaches the return position, heel 84' of latch member 78' is tripped by latch release cam 122' to unlock rod 74 from carriage 24. When carriage 24 is at the return position, gate 80 engages behind the second shoulder 108 to lock carriage 24 to base 20. This completes one operating cycle.

In the event that the conventional drive arrangement just described is rendered inoperative when fingerbar 30 is in the extended position, safety retract 182 operates to positively remove fingerbar 30 from the path of the die on the descending press ram. The conventional drive arrangement may be rendered inoperative, for example, when protection device 46 senses an overload somewhere in the transfer mechanism. With fingerbar 30 in the extended position, bar 194 on the press ram strikes roller 188 to rotate crank arm 186 from the position indicated by the dotted lines 196 in FIG. 7. The rotation of crank arm 186 is coupled through gears 190, 192 and shaft 184 to rotate square shaft 166. Rotation of shaft 166 breaks the yieldable driving connection between gear 140 and sleeve 142 so that shaft 166 rotates sleeves 142 and 170 to shift rods 32 and 34 and thereby retract fingerbar 30 from the path of the upper die on the press ram. It should be pointed out that during normal operation of transfer mechanism 14, crank arm 186 is rotated by shaft 166 so that a small gap is always maintained between roller 188 and bar 194. In this way, bar 194 never interferes with the normal operation of the transfer but is so disposed as to positively return fingerbar 30 to the disengaged position should the conventional drive arrangement become inoperative.

Figure 12:
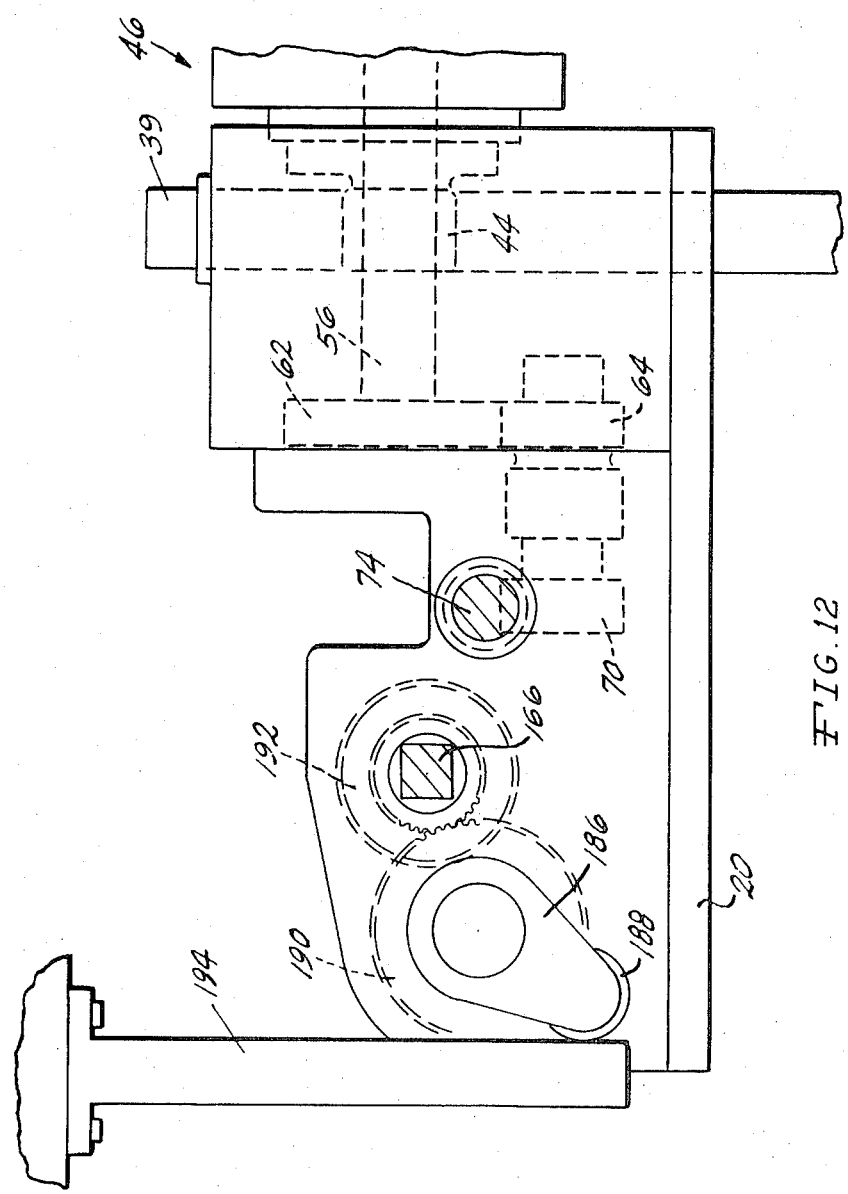
FIG. 12 is an enlarged view taken along line 12—12 in FIG. 11.

FIGS. 11 and 12 disclosed a slightly modified form of the transfer mechanism previously described. In these two figures, like numerals designate like parts of the previous embodiment and the figures require description only to the extent of the following modifications. These modifications include the provision of a second fingerbar 30' supported on carriage 24 by two rods 200 having rack portions 202. The drive arrangement is modified to provide additional gear means 204 engaging racks 202 and operative with shaft 166 to transversely shift fingerbar 30' toward and away from fingerbar 30 as the latter is being shifted toward and away from the former. Further modifications include the relocation of drive unit 37 and safety retract 182 toward the middle of base 20. In the modified embodiment, shaft 166, which in the former embodiment remained fixed relative to base 20, is now fixed with respect to carriage 22 and is slidably moved through a set of rollers 206 in safety retract 182 whenever carriage 24 is shifted.

Describing more specifically the operation of the modified embodiment, shaft 166 is rotated to shift fingerbar 30 toward the work-engaging position by means of gears 160 and 178. Gears 160 and 178 each drives one of the gears 204 to shift rods 200. Hence fingerbar 30' is simultaneously moved toward fingerbar 30 as fingerbar 30 is shifted to the work-gripping position. As carriage 24 is shifted lengthwise of base 20, shaft 166 slides through the four rollers 206 of safety retract 182 so that crank arm 186 is always operatively connected to shaft 166. Hence, should the usual drive arrangement be rendered inoperative, with fingerbars 30 and 30' in an extended position, downward movement of bar 194 always operates safety retract 182 to remove fingerbars 30 and 30' from between the closing halves of the die.

The cam and cam follower arrangement disclosed in the illustrated embodiments for shifting fingerbar 30 permits fingerbar 30 to be uniformly accelerated and decelerated without high inertial forces or erratic movement. This is particularly important because the operation of shaft 39 may be intermittent with respect to reciprocation of the press ram. For example, as the ram moves upwardly from the bottom of its stroke, a lost motion connection between the ram and shaft 39 may initially prevent shaft 39 from moving upwardly with the ram. However, when shaft 39 does become operatively connected to the ascending ram, it immediately assumes the velocity of the ram and hence experiences a large acceleration. This acceleration is transmitted to rod 74. However, by providing a smooth shape to cam 126 in sleeve 128, this high acceleration is not transmitted to fingerbar 30. While the use of this particular type of cam and cam follower arrangement achieves smooth operation of fingerbar 30, its motion-transmitting characteristics are not reciprocal. That is, sleeve 128 cannot be rotated to shift follower 124, and motion may be transmitted only by shifting rod 74. Hence, when safety retract mechanism 182 is also used in this type of transfer mechanism, a yieldable coupling must be provided, preferably as illustrated, between sleeve 128 and shaft 166.

The transverse stroke length of fingerbar 30 in either of the disclosed embodiments may be readily changed by removing sleeve 128 and replacing it by a new sleeve 128 having a differently shaped cam 126. The stroke length of carriage 24 on base 20 may be changed by adjusting the positions of bushings 114 and 114' on rod 74 and by making similar changes in the position of locking bars 106 and 106'. When changing the stroke length of carriage 24, the stroke length of rod 74 must also be changed. This may be done, for example, by modifying the connection between shaft 39 and the press ram, and/or by changing certain gear ratios within drive unit 37.

In another modified embodiment of the illustrated transfer device, the yieldable coupling between sleeve 128 and fingerbar 30 may be provided by an overload protection device of the type indicated at 46 in drive unit 37. Moreover, the device 46 may be journalled on housing 183 of safety retract 182 to thereby reduce the mass of carriage 24. In this modified arrangement, pinions 138 and 140 are relocated adjacent wall 27'. Pinion 140 is fixedly attached to one end of a telescoping sleeve. This sleeve is concentric with shaft 166 and extends between wall 27' and the drive member of overload device 46. The driven member of device 46 is fixedly attached to shaft 166 which in turn drives pinions 160 and 178 to extend and retract fingerbar 30. During normal operation, the rotation of pinion 140 rotates the telescoping sleeve which in turn rotates shaft 166 through the overload device 46. Should the transfer jam with fingerbar 30 in other than the retracted position, actuation of safety retract 182 by the press ram rotates shaft 166. The rotation of shaft 166 breaks the connection between the driving and driven members of device 46 so that fingerbar 30 is positively retracted.

In the modified embodiment of FIGS. 11 and 12, it should be appreciated that because shaft 166 is now movable relative to base 20, sufficient clearance between it and the press uprights must be provided. It should also be recognized that further modifications may be made to provide: a transfer mechanism having a single fingerbar 30 and in which shaft 166 is fixed with respect to carriage 24 and hence movable with respect to base 20; or a transfer mechanism having a pair of oppositely movable juxtaposed fingerbars and in which shaft 166 is fixed with respect to base 20.

I claim:

1. In a workpiece transfer mechanism for a press, said mechanism being adapted to transfer workpieces between regularly spaced successive stations on the press, said transfer mechanism being of the type having a base, a carriage shiftable on said base between advanced and retracted positions which are spaced apart a distance corresponding to the spacing between successive stations and also having a work-engaging finger bar shiftable on said carriage in a direction transversely of the path of travel of the carriage between an extended work-engaging position and a retracted position, that improvement which comprises, an actuating rod mounted on the carriage for axial reciprocation, means for reciprocating said rod, a rotatable shaft journalled in said carriage, means operatively connecting said rotatable shaft with the finger bar for reciprocating the finger bar between said extended and retracted positions in response to rotation of said shaft in opposite directions, cam and cam follower members on said carriage operatively connecting said actuator rod and said rotatable shaft, one of said cam and cam follower members being axially shiftable with said actuator rod, said cam member having a cam track thereon engaged by said cam follower member and extending in a direction generally axially of said actuator rod to produce displacement of the other of said cam and cam follower members in opposite directions relative to the carriage in response to axial movement of the actuator rod in opposite directions relative to the carriage, said other of the cam and cam follower members being operatively connected to said rotatable shaft such that said displacement thereof causes rotation of said shaft in opposite directions, and means operatively connecting said actuator rod and carriage for shifting said carriage between said advanced and retracted positions during selected portions of the reciprocating stroke of the rod.

2. The combination called for in claim 1 wherein said cam track has opposite end portions extending parallel to the axis of reciprocation of the actuator rod whereby axial shifting of said actuator rod when said cam follower is engaged with said end portions of the cam track is ineffective to rotate said shaft.

3. The combination called for in claim 1 wherein said cam follower is fixed relative to said actuator rod.

4. The combination called for in claim 3 wherein said cam is mounted for rotation on said carriage and rotates in response to axial shifting of the actuator rod relative to the carriage.

5. The combination called for in claim 4 including guide means fixed on the carriage and extending axially of said actuating rod, said cam follower engaging said guide means to prevent rotation of the actuator rod in response to axial reciprocation thereof.

6. The combination called for in claim 4 including gear means interconnecting said cam and said rotatable shaft.

7. The combination called for in claim 4 wherein said cam comprises a sleeve rotatably supported on said rod and said cam track comprises a helical groove in said sleeve, said cam follower being fixedly mounted on said rod and projecting into said groove and said sleeve being axially fixed on said carriage.

8. The combination called for in claim 7 wherein the axially opposite ends of said groove extend parallel to the axis of the actuator rod and are spaced apart circumferentially of said sleeve.

9. The combination called for in claim 1 wherein said cam and cam follower members provide a unidirectional drive from said actuator rod to said rotatable shaft so rotation of the shaft is incapable of shifting the actuator rod axially.

10. The combination called for in claim 9 wherein the press is of the type having a vertically movable ram for supporting a die and including means forming an overload disconnect in the drive train between the cam-cam follower members and the finger bar for operatively disconnecting the finger bar from the cam-cam follower members when the driving force to which said drive train is subjected to exceeds a predetermined value, a drive member which when actuated is adapted to shift the finger bar independently of the condition of said overload disconnect means, and means timed with the reciprocation of the press ram for actuating said drive member to retract the finger bar in the event the means for reciprocating the actuator rod are ineffective to retract the finger bar on the downstroke of the press ram.

11. The combination called for in claim 10 wherein the means for actuating the drive member comprises an actuator reciprocated vertically by the press ram.

12. The combination called for in claim 11 wherein said overload disconnect means forms a part of the operative connection between the cam-cam follower members and said rotatable shaft.

13. The combination called for in claim 12 wherein said drive member is operatively connected with said rotatable shaft.

14. The combination called for in claim 12 including a gear drive between said drive member and said rotatable shaft.

* * * * *